United States Patent [19]

Ricks et al.

[11] Patent Number: 5,676,599
[45] Date of Patent: Oct. 14, 1997

[54] OUTER JOINT PART FOR A TRIPOD JOINT

[75] Inventors: Michael Ricks, Nidderau; Peter Bilz, Freigericht; Dieter Sattler, Mühlheim; Werner Jacob, Frankfurt, all of Germany

[73] Assignee: Lohr & Bromkamp GmbH, Offenbach am Main, Germany

[21] Appl. No.: 437,526

[22] Filed: May 9, 1995

Related U.S. Application Data

[63] Continuation-in-part of Ser. No. 236,893, May 2, 1994, abandoned.

[30] Foreign Application Priority Data

May 3, 1993 [DE] Germany .................. 43 14 503.5

[51] Int. Cl.⁶ .................................................. F16C 1/26
[52] U.S. Cl. .................................................. 464/170
[58] Field of Search .......................... 464/111, 120, 464/122, 123, 170, 177, 185, 905

[56] References Cited

U.S. PATENT DOCUMENTS

| | | | |
|---|---|---|---|
| 2,477,449 | 7/1949 | Godsey | 464/123 |
| 3,318,108 | 5/1967 | Cadiou | 464/111 X |
| 3,792,596 | 2/1974 | Orain | 464/123 |
| 4,091,641 | 5/1978 | Welschof | 464/123 X |
| 4,275,799 | 6/1981 | Guimbretiere | 464/111 X |
| 4,541,817 | 9/1985 | Sawabe et al. | 464/111 |
| 4,565,540 | 1/1986 | Orain | 464/111 |
| 4,708,693 | 11/1987 | Orain | 464/111 |
| 4,741,723 | 5/1988 | Orain | 464/905 X |
| 4,764,153 | 8/1988 | Jacob | 464/905 X |
| 5,160,108 | 11/1992 | Orain | |
| 5,207,616 | 5/1993 | Moulinet | 464/111 |

FOREIGN PATENT DOCUMENTS

| | | | |
|---|---|---|---|
| 0010999A1 | 5/1980 | European Pat. Off. | |
| 0208568A1 | 1/1987 | European Pat. Off. | |
| 0454592A1 | 10/1991 | European Pat. Off. | |
| 40-4357329 | 12/1992 | Japan | 464/111 |
| 2104919 | 3/1983 | United Kingdom | 464/185 |

*Primary Examiner*—Daniel P. Stodola
*Assistant Examiner*—Eileen A. Dunn
*Attorney, Agent, or Firm*—Harness, Dickey & Pierce, P.L.C.

[57] ABSTRACT

An outer joint part for a tripod joint has a track portion with three circumferentially distributed, longitudinally extending, axis-parallel inner recesses with approximately parallel walls. A flange is secured to the track portion to connect shaft or gearbox parts. The portion of the outer joint part is produced by cold-forming with an approximately constant wall thickness. The flange includes a central inner recess whose inner contour mates with the outer contour of the track portion. The flange is slid on and connected to the track portion.

9 Claims, 5 Drawing Sheets

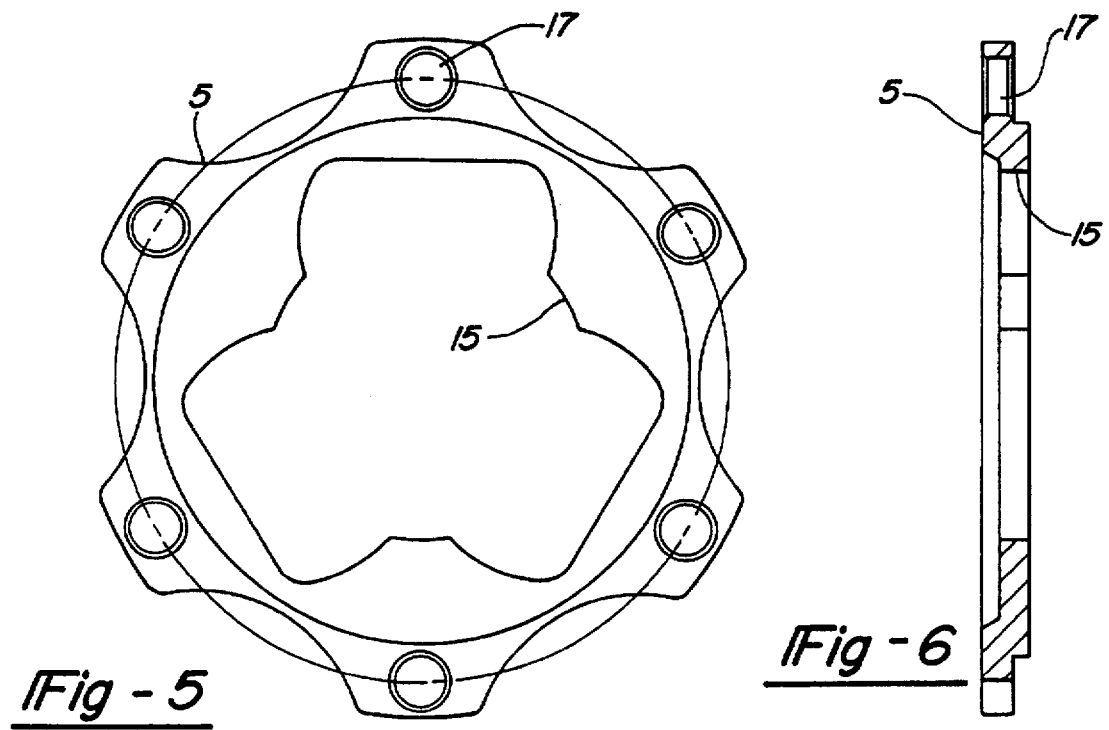

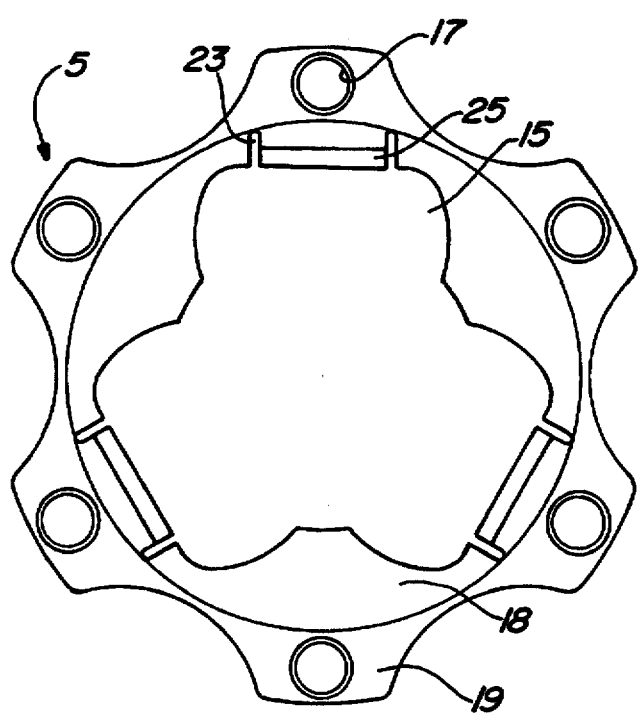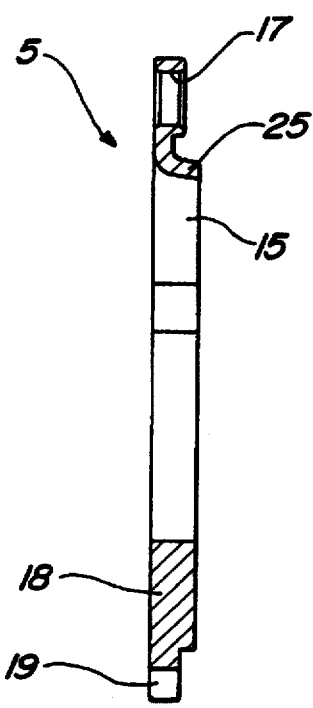
*Fig - 9B*    *Fig - 10B*

5,676,599

1

OUTER JOINT PART FOR A TRIPOD JOINT

This application is a continuation-in-part of U.S. patent application Ser. No. 08/236,893 filed May 2, 1994 entitled Outer Joint Part for a Tripod Joint and now abandoned.

BACKGROUND OF THE INVENTION

The invention relates to an outer joint part of a tripod joint. The outer joint part is adapted to receive an inner joint part with a connecting shaft. The inner joint part includes three circumferentially distributed tripods arms which correspond to inner recesses in the outer joint part. Each arm carries a roller unit movable relative to the tripods arm at least in the axial direction. The tripod arms together with the roller units engage the inner recesses and, in the longitudinal direction of the track, torque transmittingly engage the track so that they are slidable on the track.

An outer joint part as mentioned and a method of making the same is known from U.S. Pat. No. 4,453,395. Here a flange to connect shafts or gearbox parts is integrally formed out of the material of the track portion. In the region of transition from the longitudinally extending recesses to the radially formed flange complicated deformation conditions exist which may lead to the formation of cracks. The process of deformation in this region requires a number of deformation stages which, in turn, require a number of different tools.

At the open end of the connecting shaft of the inner joint part, which is positioned axially opposite the flange, the outer joint part ends with axis-parallel wall regions. The wall regions either include unchanged cross-section of the track portion or, via a transition region, a change into a round cross-section. The starting material for the track portion is a sheet annulus from which, initially the track portion is produced by deep drawing.

U.S. Pat. No. 5,160,108 also describes an outer joint part of the initially mentioned type and a process of producing it. In this case, the track portion of the outer joint part, at its end which connects shafts or gearbox parts, includes a joint base. The base includes a planar welded flange or a centering aperture into which a shaft is inserted and welded in the outer joint part. A radially outwardly pointing edge is provided at the open end for the connecting shaft of the inner joint part. Again, the track portion of the outer joint part described in this publication is produced from deep drawing a sheet annulus.

SUMMARY OF THE INVENTION

On the basis of the above-mentioned state of the art, it is an object of the invention to simplify the production of the outer joint part while maintaining a high degree of stability and to reduce the respective production costs. To achieve objective, the flange includes a central inner recess whose inner contour mates with the three projections of the outer contour of the track portion. The flange is thus slid onto and connected to the track portion. In this way, it is possible to avoid complicated deformation processes and produce the flange separately from the track portion from a planar material, especially by cutting or punching. Thus, when producing the track portion, as an alternative to deep drawing, it is possible to use a cold extrusion process or, as a particular example alternative, to cut to length drawn tubes of the required contour and cross-section. In the latter case, it is also possible to use round tubes as the starting material which are subsequently formed into contoured track portions.

2

Preferred methods of fixing the flange to the track portion are welding, soldering, gluing, riveting or shrinking, with soldering possibly taking place simultaneously with heat treatment. To achieve an improved fit or even a slight press-fit, it is particularly advantageous if the flange includes a beaded inner contour whose wall thickness is reduced relative to the flange thickness, preferably about 0.3 to 0.6 times the flange thickness.

The flange whose inner cross-section is adapted to the outer cross-section of the track portion advantageously reinforces the latter while simplifying production so that the track portion does not require a formed base portion. This does not mean that a base portion cannot be provided, but it may be sufficient to bead the track portion only slightly and in portions to provide end stops for the rollers on the tripod arms. As a rule, the flange will be secured near one end of the track portion, but for strength reasons, it may be slid onto the track portion at a distance from the end if allowed by the connection conditions with respect to connecting shaft or gearbox parts.

At the opposed open end of the track portion for the shaft connection of the inner joint part, the track portion may include, for stiffening purposes, an integrally formed outwardly extending flange. Since the flange does not serve a torque transmitting function, forming such a smaller flange does not cause any problems but will improve stiffness of the track portion.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention will be described below with reference to the drawings wherein:

FIG. 5 is a plan view of a flange of an outer joint part in accordance with the invention, shown as an individual part.

FIG. 6 is an axial sectional view through the flange of FIG. 5 through line 6—6 thereof.

FIG. 9B is a view like FIG. 9A after deformation.

FIG. 10B is an axial section view through the flange of FIG. 9B along line 10B—10B.

DETAILED DESCRIPTION OF THE PREFERRED EMBODIMENT

Figure 1:
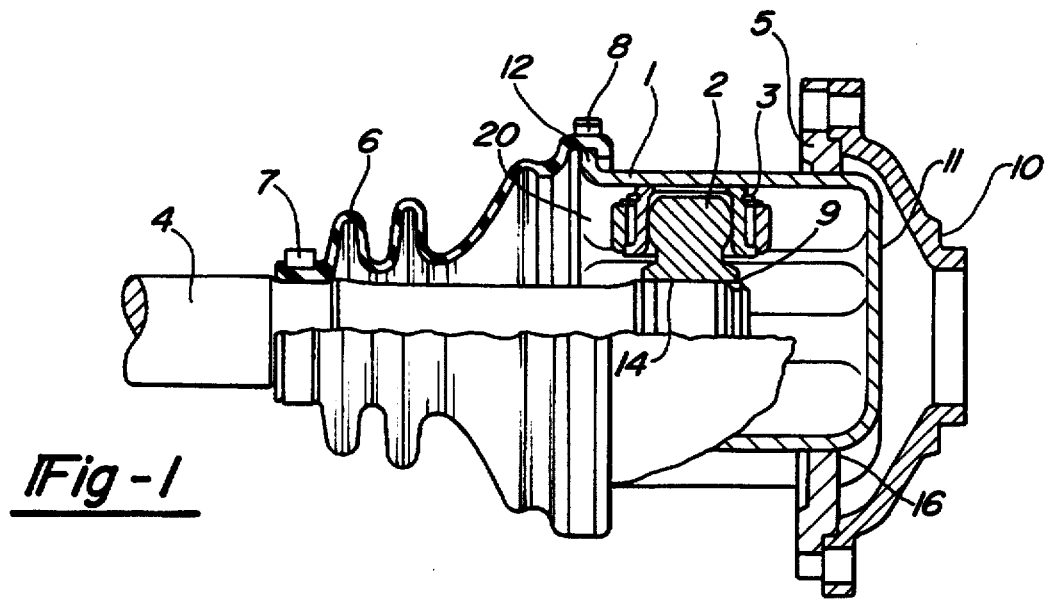
FIG. 1 is a partial longitudinal sectional view through a tripod joint assembly with an outer joint part in accordance with the invention.
Figure 2:
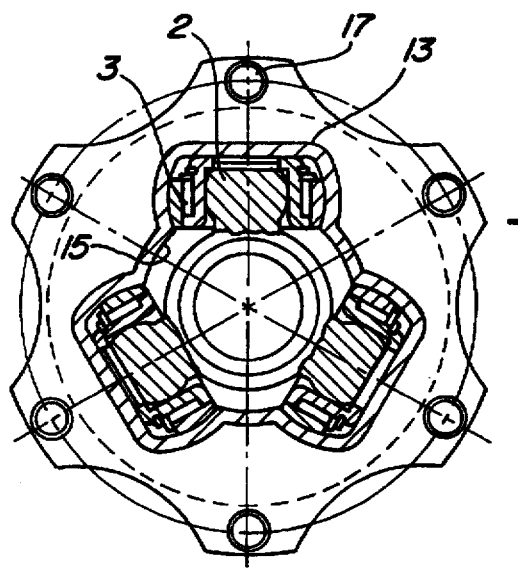
FIG. 2 is a cross-sectional view through the tripod joint assembly of FIG. 1 through line 2—2 thereof.

FIGS. 1 and 2 which, below, will be described jointly, show the outer joint part 10 and the inner joint part 20. The outer joint part includes a track portion 1 whose walls extend substantially axis-parallel. At one axial end, the track portion 1 is closed by a base 11. At its other axial end, the track portion 1 includes a radially outwardly extending end flange 12. The track portion includes three circumferentially distributed inner recesses 13 which guide roller units 3 of the inner joint part 20 which are arranged directly on tripod arms 2 and which form outer projections.

A connecting shaft 4 is inserted into the inner joint part 20, which is also referred to as a tripod and is axially secured by a securing ring 9. Both engage one another by shaft teeth 14. The open end of the outer joint part at the end of the flange 12 is sealed by a convoluted boot 6 relative to the connecting shaft 4. The convoluted boot is secured to the shaft 4 and the outer joint part 10 by perforated strip clips 7, 8.

A flange 5 is slid onto the track portion 1 of the outer joint part 10. The flange 5 includes an inner aperture 15 adapted to mate with the outer contour of the projections of the track portion 1. The flange 5 and the track portion 1 are connected to one another by a circumferential weld 16. A plan view in FIG. 2 shows fixing bores 17 in the flange. The flange 5 is welded onto the outer joint part 10 in the vicinity of the base 11. It is appreciated that the track portion 1, at the end of the flange 5, may also end in an open and cylindrical way and, if applicable, stops may be drawn slightly inwardly for the roller units 3. A counter flange indicated by dashed lines is secured to the flange 5.

Figure 3:
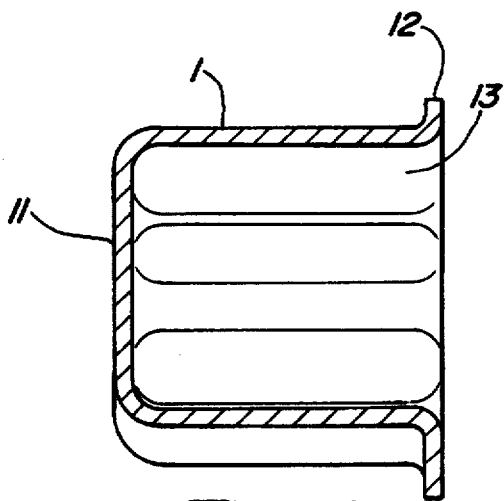
FIG. 3 is a longitudinal sectional view through a track portion of an outer joint part in accordance with the invention, shown as an individual part.
Figure 4:
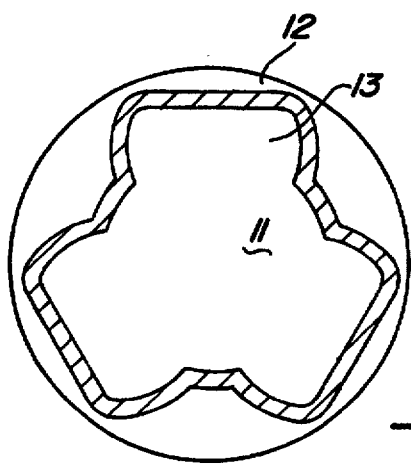
FIG. 4 is a cross-sectional view through the track portion of FIG. 3 through line 4—4 thereof.
Figure 7A:
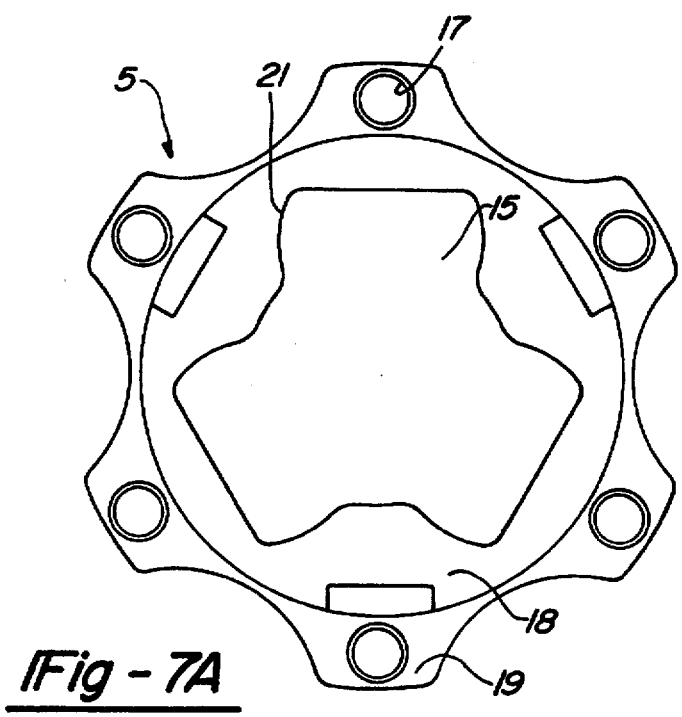
FIG. 7A is a second embodiment of a plan view of a flange of an outer joint part prior to deformation, in accordance with the present invention.
Figure 8A:
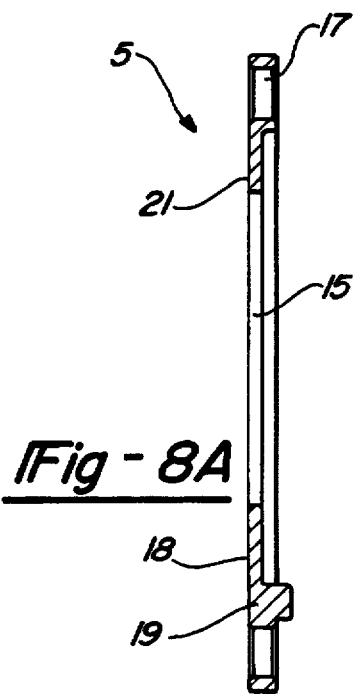
FIG. 8A is an axial view through the flange of FIG. 7A along line 8A—8A thereof.
Figure 7B:
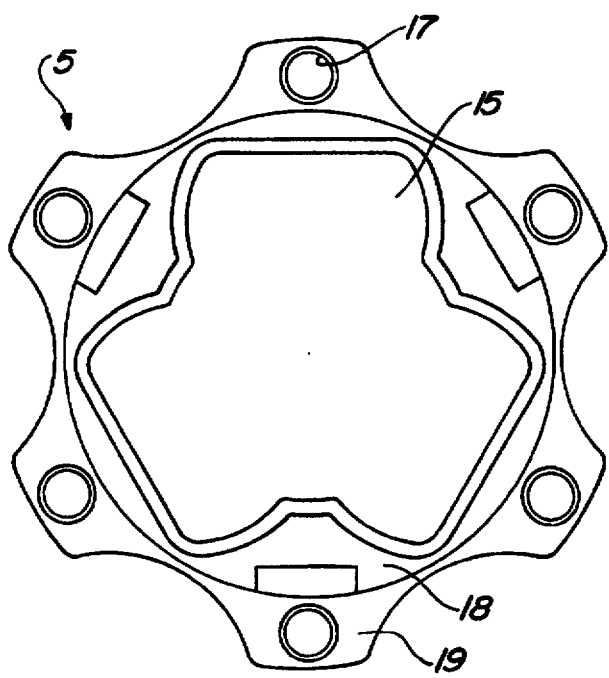
FIG. 7B is like FIG. 7A after deformation.
Figure 8B:
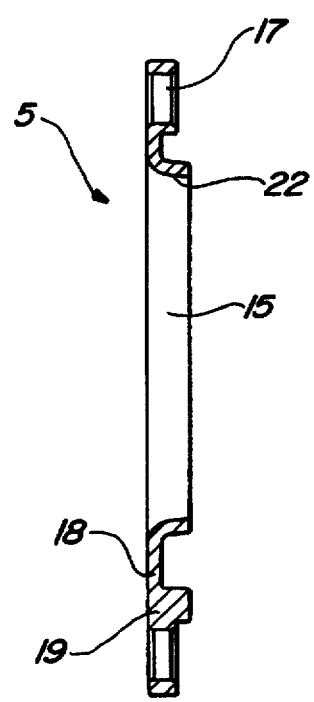
FIG. 8B is an axial section view through the flange of FIG. 7B along line 8B—8B thereof.
Figure 9A:
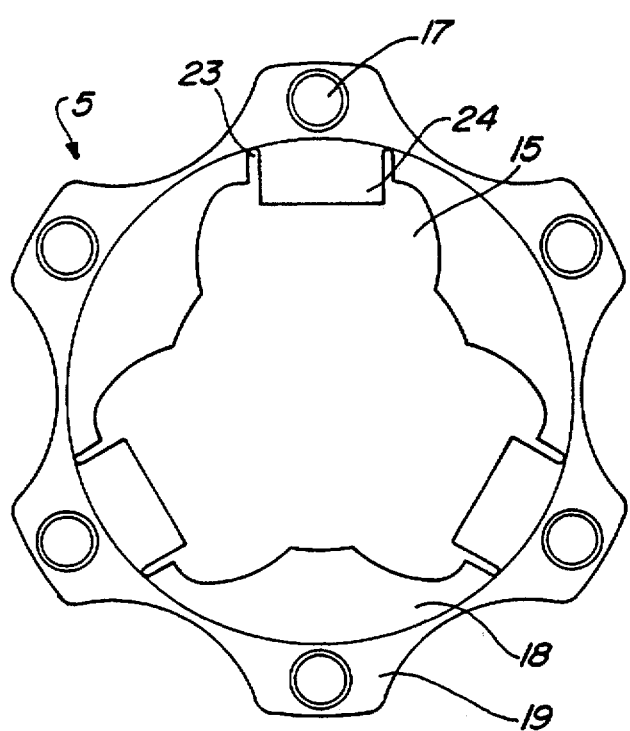
FIG. 9A is a third embodiment of a plan view of a flange of an outer joint part, prior to deformation, in accordance with the present invention.
Figure 10A:
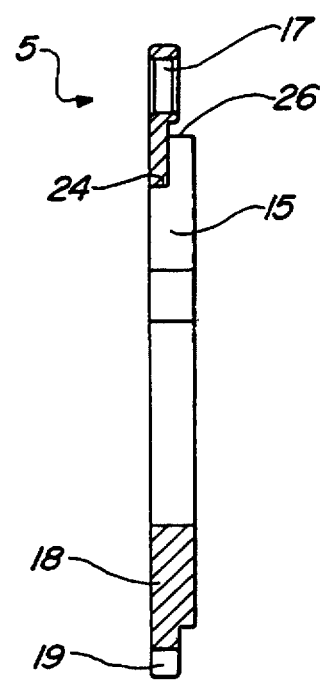
FIG. 10A is an axial section view through the flange of FIG. 9A along line 10A—10A thereof.

FIGS. 3 and 4 show the track portion 1 with the closing base 11 and the end flange 12 formed onto the opposed end. FIG. 4 shows that the outside of the end flange 12 is delimited circularly. The three circumferentially distributed recesses 13 respectively projections can also be seen.

FIGS. 5 and 6 show a detail of the flange 5 and the inner aperture 15 whose contour corresponds to the three above-mentioned projections of the track portion 1. The fixing bores 17, for a counter flange, are also visible.

FIGS. 7A, 7B, 8A and 8B, which illustrate the flange before and after deformation show a flange 5 wherein the central flange part 18 surrounding the inner aperture 15 has a wall thickness of about only half the one of an outer flange part 19 which includes the fixing holes 17 for a connection device. The delimitation between the inner flange part 18 and the outer part 19 is circular. The contour of the inner aperture corresponds to the one of the track portions. In dotted lines it is shown that the inner aperture 15 is originally made smaller with the flange part 18 having a planar configuration and that afterwards an inner edge 21 has been deformed so as to form a beaded structure 22.

FIGS. 9A, 9B, 10A and 10B, which illustrate a flange before and after deformation show a flange 5 which includes an inner aperture 15, the contour of which corresponds to the one of a track portion. Fixing holes 17 are in an outer flange part 19, whereas a central flange part 18, which surrounds the inner aperture 15, is partially made from a thicker wall thickness material. The delimitation between the inner flange part 18 and the outer part 19 is a circle. In the inner part 18, there are three pairs of generally radial cuts 23 which form lashings 24 inbetween the cuts. In dotted lines, it is shown that these lashings originally are planar with respect to the flange and by deformation of the lashing 24, bead like parts 25 are formed which might be riveted to the track portion 1 of the joint. A position of a rivet 26 is shown by its center line only.

While the above detailed description describes the preferred embodiment of the present invention, the invention is susceptible to modification, variation and alteration without deviating from the scope and fair meaning of the subjoined claims.

We claim:

1. An outer joint part for a tripod joint comprising:
    a track portion having three circumferentially distributed, longitudinally extending, axis-parallel inner recesses with approximately longitudinally parallel walls, said track portion of the outer joint part produced with an approximately constant wall thickness forming an outer contour having three projections;
    a flange secured to said track portion for connecting shaft or gearing parts, said flange including a central inner recess whose inner contour corresponds to the three projections of the outer contour of the track portion and form fittingly engages the three projections of the outer contour of the track portion and said flange being slid on and connected to said track portion.

2. An outer joint part according to claim 1, wherein the flange is welded to the track portion.

3. An outer joint part according to claim 1, wherein said flange is soldered to the track portion.

4. An outer joint part according to claim 1, wherein said the flange is glued to the track portion.

5. An outer joint part according to claim 1, wherein said flange is secured onto the track portion by shrink fitting.

6. An outer joint part according to claim 1, wherein said flange includes a beaded inner contour whose wall thickness is reduced relative to the flange thickness, in the range of about 0.3 to 0.6 times the flange thickness.

7. An outer joint part according to claim 1, wherein said outer, joint part includes an opening end for a connecting shaft of an inner joint part, and the track portion at said opening end includes radially outwardly pointing end flange.

8. An outer joint part according to claim 1, wherein said outer joint part includes a second end opposed to an opening end for the connecting shaft of the inner joint part and the track portion at said second end is at least partially closed by a base.

9. An outer joint part according to claim 1, wherein said outer joint part includes a second end and said flange is secured to the outer joint part near the second end opposed to an opening end for the connecting shaft of the inner joint part.

* * * * *